(12) United States Patent
Kristo et al.

(10) Patent No.: US 10,399,848 B2
(45) Date of Patent: Sep. 3, 2019

(54) METHOD AND APPARATUS FOR PROCESSING A FIBER CUSHION BODY

(71) Applicant: Schukra Gerätebau GmbH, Berndorf (AT)

(72) Inventors: Darko Kristo, Bad Vöslau (AT); Georg Könczöl, Vienna (AT); Jan Petzel, Tübingen (DE)

(73) Assignee: Schukra Gerätebau GmbH, Berndorf (AT)

(*) Notice: Subject to any disclaimer, the term of this patent is extended or adjusted under 35 U.S.C. 154(b) by 0 days.

(21) Appl. No.: 15/571,807

(22) PCT Filed: May 6, 2015

(86) PCT No.: PCT/EP2015/059975
§ 371 (c)(1),
(2) Date: Nov. 3, 2017

(87) PCT Pub. No.: WO2016/177425
PCT Pub. Date: Nov. 10, 2016

(65) Prior Publication Data
US 2019/0002272 A1    Jan. 3, 2019

(51) Int. Cl.
*B68G 7/02* (2006.01)
*B68G 11/03* (2006.01)
*B29D 99/00* (2010.01)
*B60N 2/70* (2006.01)
*A47C 7/24* (2006.01)

(52) U.S. Cl.
CPC .............. *B68G 11/03* (2013.01); *A47C 7/24* (2013.01); *B29D 99/0092* (2013.01); *B60N 2/7017* (2013.01); *B68G 7/02* (2013.01)

(58) Field of Classification Search
CPC ...... B68G 11/03; B68G 7/02; B29D 99/0092; B60N 2/7017; A47C 7/24
See application file for complete search history.

(56) References Cited

U.S. PATENT DOCUMENTS

| 4,908,494 A | 3/1990 | Faiz et al. |
| 2010/0287708 A1 | 11/2010 | Shelby |
| 2011/0010863 A1 | 1/2011 | Rubio |

FOREIGN PATENT DOCUMENTS

| CN | 1 126 787 A | 7/1996 |
| EP | 2417876 A | 2/2012 |
| JP | H04253892 A | 9/1992 |
| JP | 2003 088449 A | 3/2003 |
| JP | 3 468973 B2 | 11/2003 |
| JP | 2009247435 A | 10/2009 |
| JP | 2011225141 A | 11/2011 |
| KR | 20000040212 A | 7/2000 |

OTHER PUBLICATIONS

PCT/EP2015/059975 International Search Report and Written Opinion from the International Searching Authority dated Jan. 25, 2016 (12 pages).
Office Action from the Canadian Intellectual Property Office for Application No. 2,982,469 dated Aug. 8, 2018 (6 pages).

*Primary Examiner* — Michael C Miggins
(74) *Attorney, Agent, or Firm* — Michael Best & Friedrich LLP (57) ABSTRACT

A fiber cushion body comprises a first portion in which fibers have a preferential orientation along a first direction and at least a second portion having a fiber orientation and/or density different from the first portion. The fiber cushion body is processed using laser radiation to form a laser cut or laser weld.

16 Claims, 7 Drawing Sheets

METHOD AND APPARATUS FOR PROCESSING A FIBER CUSHION BODY

FIELD OF THE INVENTION

Embodiments of the invention relate to cushion bodies formed from fibers. Embodiments of the invention relate in particular to a method and a system for processing a fiber cushion body formed from thermally cross-linked fibers. Embodiments of the invention relate in particular to such a method and system for processing a fiber cushion body from fibers for use in vehicle seats, office seats, or residential seats.

BACKGROUND OF THE INVENTION

Foams, such as polyurethane (PU) foams, are widely used as fabric backings for seats, such as for vehicle interior materials in the transportation industry. The foams are adhered to the backs of textile face materials. These foam backed composites have a cushion effect which can offer comfort or a luxurious feel in contact areas.

Polyurethane foam is widely used as cushioning material for seats. However, the polyurethane foam backed material can emit volatile substances, which may contribute to 'fogging' of vehicle or housing interiors and can furthermore include critical substances, which may negatively affect human health. Furthermore the foam itself may oxidize over time leading to a color change in the material. Recyclability is also an issue which has to be addressed.

For these and other reasons, there is a continued need for another material that would provide cushion properties similar to the ones of foam materials at similar costs. One class of materials which would be suitable for use in seat cushions is nonwovens, for example polyester nonwovens. These materials can provide a suitable backing to many face fabrics and address some of the needs which are difficult to address with conventional PU foam cushions.

Methods of producing mats of perpendicular laid, thermally bonded nonwovens, including air laid and "Struto" nonwoven techniques, have strived to provide a cushion with an economical and weight advantage to previous nonwoven technologies. Many of these techniques orient the staple fibers into a vertical position in a two-dimensional layer. By joining plural such pre-formed mats, a fiber cushion body may be formed.

Another technique for manufacturing a three-dimensional fiber cushion body includes inserting loose fiber material into a three-dimensional mold and supplying heat to the fibers inserted into the mold to cause thermal cross-linking. At least a fraction of the fibers may be oriented so as to predominantly align with a preferential before heat is supplied to effect thermal cross-linking. Such techniques have the advantage that a great variety of three-dimensional shapes may be formed. However, the costs required to produce molds may impose constraints on the number of different mold geometries which may be available and, thus, on the number of three-dimensional fiber cushion geometries which may be produced in the molding process.

SUMMARY

In view of the above, there is a continued need in the art for a method and system of providing a fiber cushion body which addresses some of the above needs, as well as a fiber cushion body formed using such techniques. There is in particular a need in the art for a method and system which allows a wide variety of cushion body geometries to be realized without requiring a dedicated mold for each one of the geometries. There is in particular a need in the art for such a method and system which afford a high degree of automation and high processing speeds in processing fiber cushion bodies for their intended use in vehicle seats, office furniture or residential furniture.

According to embodiments, techniques are provided in which laser radiation is used to process a fiber cushion body. The fiber cushion body is an integral body formed from thermally cross-linked fibers.

The laser radiation may be applied to the fiber cushion body to form at least one channel in the fiber cushion body. Alternatively or additionally, the laser radiation may be applied to the fiber cushion body to seal at least one surface of the fiber cushion body. Alternatively or additionally, the laser radiation may be applied to the fiber cushion body to set an external contour in dependence on a geometry of a seat or furniture in which the fiber cushion body is to be used. Alternatively or additionally, the laser radiation may be applied to the fiber cushion body to form a weld on the fiber cushion body. The weld may be used for affixing a rigid member, such as a clip, or a trim material to the fiber cushion body.

According to embodiments, there is also provided a fiber cushion body formed form thermally cross-linked fiber material which includes a surface having at least one of a laser weld or a laser cut.

A method of processing a fiber cushion body formed from thermally cross-linked fibers is provided according to an embodiment. The method comprises applying laser radiation to the fiber cushion body to form at least a laser cut or a laser weld in the fiber cushion body. The fiber cushion body to which the laser radiation is applied comprises a first portion in which fibers have a preferential orientation along a first direction and at least a second portion having a fiber orientation and/or density different from the first portion.

By applying laser radiation for processing such a fiber cushion body, the thermoplastic characteristics of at least some fibers which form a thermally cross-linked fiber cushion body may be harnessed.

The thermally cross-linked fibers may include matrix fibers and binding fibers, which are thermally activated to effect thermal cross-linking. The binding fibers may include a material having a melt temperature which is lower than a melt temperature of the matrix fibers.

A power of the laser radiation may be set such that both matrix fibers and binding fibers are severed by the laser radiation.

The first portion of the fiber cushion body may be a portion which provides resilient characteristics. In the first portion, at least 50% of the fibers may be oriented so as to enclose an angle of less than 45° with the first direction. The first direction may be the load direction of the fiber cushion body.

The second portion of the fiber cushion body may be a portion located at a major face of the fiber cushion body. The second portion may have a fiber orientation which is different from that of the first portion. In the second portion, at least 50% of the fibers may be oriented so as to enclose an angle of more than 45° with the first direction.

The laser radiation may be applied at least to the second portion of the fiber cushion body.

The laser radiation may be applied to extend through the second portion into the first portion. Thereby, laser cuts and/or laser welds may be formed which extend into the first portion which provides the resiliency of the fiber cushion body.

Applying the laser radiation may comprise forming at least one channel using the laser radiation. Problems associated with molds which define projections for forming channels may thus be mitigated. Channels may be conveniently formed in the fiber cushion body after thermal cross-linking, thus mitigating the cost and complexity which would be associated with forming channels when fibers are supplied into a mold prior to thermal activation.

Side walls of the at least one channel may be cut by the laser radiation. The method may further comprise applying ultrasound to a bottom of the channel. Thereby, well-defined, clean laser cuts on the lateral side walls of the channel may be combined with the consolidation in fiber material at the bottom attainable by ultrasonic treatment.

A combination of laser cutting or laser welding and ultrasonic treatment may also be used for other purposes than for forming a channel. For illustration, the method may comprise applying ultrasonic energy to a laser cut formed by laser radiation.

The method may comprise affixing a trim material to the at least one channel. This may be implemented in various ways. A fastening member, e.g. a clip, may be inserted in the channel. The fastening member may be attached by laser welding. The trim material may be secured to the fastening member.

Alternatively or additionally, the trim material may be directly welded to the fiber cushion body by laser radiation. A laser weld may be formed so as to be recessed in the at least one channel.

Applying the laser radiation may comprise inserting an optical element into a beam path. A laser head which outputs the laser radiation may be configured to allow the optical element to be inserted into the beam path and to be removed from the beam path. The laser head may comprise a mount which allows the optical element to be moved into and out of the beam path.

The optical element may comprise a lens.

Alternatively or additionally, the optical element may comprise a deflection device, e.g. a mirror or other reflector. The deflection device may be controllable to control a deflection angle.

The method may comprise inserting the optical element to form a divergent laser beam to provide the at least one channel with a flared shape. The at least one channel may flare as it extends from a surface of the fiber cushion body into the interior of the fiber cushion body.

Applying the laser radiation may comprise forming a fixation region in the fiber cushion body by the laser radiation, the fixation region having a density which is greater than a density of the first portion.

The fixation region may be used for forming a strong attachment region between the fiber cushion body and a rigid element. The rigid element may be a screw or other attachment element.

The method may comprise attaching a lumbar support device to the fixation region formed in the fiber cushion body.

Applying the laser radiation may comprise performing a welding operation using the laser radiation.

A fixation element may be welded to the fiber cushion body by the laser radiation. The fixation element may be a clip or another fixation element for a trim material.

Alternatively or additionally, a trim material may be directly welded to the fiber cushion body by the laser radiation.

The trim material may include thermoplastic material, e.g. thermoplastic fibers, or may be formed from thermoplastic material, e.g. thermoplastic fibers. The trim material may be directly welded to the fiber cushion body.

Applying the laser radiation may comprise sealing a surface of the fiber cushion body using the laser radiation. Thereby, good surface characteristics may be attained in an efficient way.

Applying the laser radiation may comprise cutting free fiber ends by the laser radiation. Such free fiber ends may be present at faces of the fiber cushion body, e.g. at faces which abut on molds during the manufacturing process. The free fiber ends projecting from a face of the fiber cushion body may be cut by the laser radiation so as to reduce the length by which they project from the face of the fiber cushion body.

In any one of the embodiments, the method may comprise directing a gas flow onto a location at which the laser radiation is applied to the fiber cushion body. Thereby, the formation of coarse structures at the cut or weld may be reduced. Surface characteristics of the fiber cushion body may be improved.

The gas flow may be a flow of pressurized air. The gas flow may be a flow of a protective gas.

The method may comprise forming the fiber cushion body from fibers.

The method may comprise inserting the fibers into a mold and thermally activating at least a fraction of the fibers.

The method may comprise orienting the fibers prior to supplying heat. Thereby, a fiber cushion body may be formed in which, in at least one zone of the fiber cushion body, the fibers have a preferential direction corresponding to a main load direction of the fiber cushion body. A desired soft feel touch and good breathability of the fiber cushion body may be attained.

To orient the fibers after insertion into the mold, the location and/or size of an area or of areas at which gas is drawn from the mold may be adjusted based on the filling level. Gas may be drawn from the mold over major faces of the mold, which are spaced along the direction which corresponds to the main load direction. Gas may be drawn from the mold at areas of the major faces of the mold which are respectively disposed lower than a current filling level of the fiber material in the mold.

The method may comprise producing the fibers. Forming the fibers may comprise cutting at least one yarn into segments and separating the segments into their filaments to form the fibers. The method may comprise transporting the fibers from a cutter to the mold using a gas flow, e.g. an air flow.

The method may comprise installing the fiber cushion body in one of a vehicle seat, office furniture or residential furniture. The fiber cushion body having at least one laser cut or laser weld may be used in a automotive seat, an aviation seat, a train seat, or a public transportation seat. The treated fiber cushion body may be used in a seat for home or office seating.

A fiber cushion body according to an embodiment comprises a first portion in which fibers have a preferential orientation along a first direction, and at least a second portion having a fiber orientation and/or density different from the first portion. The first portion and the second portion may be integrally formed. A laser cut and/or a laser weld may be formed on the fiber cushion body.

Such a fiber cushion body may be produced in a cost-efficient manner. The shape of a fiber cushion blank may be modified by forming laser cuts and/or laser welds.

The fiber cushion body may comprise a transition portion interposed between the first portion and the second portion. The fiber orientation and/or fiber density may vary gradually from the first portion to the second portion in the transition portion.

The fiber cushion body may be produced using the method according to any embodiment or the apparatus according to any embodiment.

The fiber cushion body may comprise at least one channel. At least a side wall of the at least one channel may be a laser cut surface.

A trim material may be attached to the fiber cushion body in the at least one channel. A fixation element, such as a clip, or a laser weld may attach the trim material to the fiber cushion body.

The fiber cushion body may comprise a fixation region which includes at least one of a laser cut or a laser weld. A rigid element, such as a screw or a part of a lumbar support device, may be attached to the fiber cushion body at the fixation region.

The fiber cushion body may comprise a laser weld. A trim material may be attached to the fiber cushion body by the laser weld. A fixation element, such as a clip, may be welded to the fiber cushion body at the laser weld.

The trim material may include thermoplastic material, e.g. thermoplastic fibers, or may be formed from thermoplastic material, e.g. thermoplastic fibers. The trim material may be directly welded to the fiber cushion body.

According to an embodiment, there is provided a seat or a furniture which includes at least one fiber cushion body according to an embodiment.

The seat or furniture may include one of a vehicle seat, office furniture or residential furniture. The fiber cushion body having at least one laser cut or laser weld may be installed in a automotive seat, an aviation seat, a train seat, or a public transportation seat. The fiber cushion body may be installed in a seat for home or office seating.

An apparatus for processing a fiber cushion body formed from cross-linked fiber material according to an embodiment comprises a receptacle configured to receive the fiber cushion body, the fiber cushion body comprising a first portion in which fibers are oriented along a first direction and at least a second portion having a fiber orientation and/or density different from the first portion, and a laser head mounted movably relative to the receptacle and configured to apply laser radiation to the fiber cushion body.

By applying laser radiation for processing such a fiber cushion body, the thermoplastic characteristics of at least some fibers which form a thermally cross-linked fiber cushion body may be harnessed.

The apparatus may comprise a gas flow generation device configured to direct a gas flow onto a location at which the laser radiation is applied to the fiber cushion body.

The gas flow may be a flow of pressurized air or of protective gas.

The apparatus may be configured to perform the method according to any embodiment.

The apparatus may be configured to form a laser cut or laser weld on thermally cross-linked fibers which may include matrix fibers and binding fibers, which are thermally activated to effect thermal cross-linking. The binding fibers may include a material having a melt temperature which is lower than a melt temperature of the matrix fibers.

The apparatus may be configured to set a power of the laser radiation such that both matrix fibers and binding fibers are severed by the laser radiation.

The first portion of the fiber cushion body may be a portion which provides resilient characteristics. In the first portion, at least 50% of the fibers may be oriented so as to enclose an angle of less than 45° with the first direction. The first direction may be the load direction of the fiber cushion body.

The second portion of the fiber cushion body may be a portion located at a major face of the fiber cushion body. The second portion may have a fiber orientation which is different from that of the first portion. In the second portion, at least 50% of the fibers may be oriented so as to enclose an angle of more than 45° with the first direction.

The apparatus may be configured to apply the laser radiation at least to the second portion of the fiber cushion body.

The apparatus may be configured to apply the laser radiation to extend through the second portion into the first portion. Thereby, laser cuts and/or laser welds may be formed which extend into the first portion which provides the resiliency of the fiber cushion body.

The apparatus may be configured to apply the laser radiation to form at least one channel using the laser radiation. Problems associated with molds which define projections for forming channels may thus be mitigated. Channels may be conveniently formed in the fiber cushion body after thermal cross-linking, thus mitigating the cost and complexity which would be associated with forming channels when fibers are supplied into a mold prior to thermal activation.

The apparatus may be configured to cut side walls of the at least one channel by the laser radiation.

The apparatus may comprise an ultrasonic sonotrode.

The apparatus may be configured to apply ultrasound to a bottom of the channel. Thereby, well-defined, clean laser cuts on the lateral side walls of the channel may be combined with the consolidation in fiber material at the bottom attainable by ultrasonic treatment.

The apparatus may be configured to combine laser cutting or laser welding and ultrasonic treatment for other purposes than for forming a channel. For illustration, the apparatus may be configured to apply ultrasonic energy to a laser cut formed by laser radiation.

The apparatus may be configured to form a trim channel in which a trim material is attached. This may be implemented in various ways. A fastening member, e.g. a clip, may be inserted in the channel. The fastening member may be attached by the apparatus by laser welding. The trim material may be secured to the fastening member.

Alternatively or additionally, the trim material may be directly welded to the fiber cushion body by the apparatus using the laser radiation. A laser weld may be formed so as to be recessed in the at least one channel.

The apparatus may be configured such that an optical element may be selectively inserted into a beam path of the laser radiation. A laser head which outputs the laser radiation may be configured to allow the optical element to be inserted into the beam path and to be removed from the beam path. The laser head may comprise a mount which allows the optical element to be moved into and out of the beam path.

The optical element may comprise a lens.

Alternatively or additionally, the optical element may comprise a deflection device, e.g. a mirror or other reflector. The deflection device may be controllable to control a deflection angle.

The apparatus may be configured to insert the optical element to form a divergent laser beam to provide the at least one channel with a flared shape. The at least one channel may flare as it extends from a surface of the fiber cushion body into the interior of the fiber cushion body.

The apparatus may be configured to apply the laser radiation to form a fixation region in the fiber cushion body by the laser radiation, the fixation region having a density which is greater than a density of the first portion.

The fixation region may be used for forming a strong attachment region between the fiber cushion body and a rigid element. The rigid element may be a screw or other attachment element.

A system according to an embodiment comprises a fiber cushion body and an apparatus according to an embodiment, with the fiber cushion body being received in the receptacle of the apparatus.

According to another embodiment, there is provide the use of the apparatus according to any embodiment for processing a fiber cushion body.

A lumbar support device may be attached to the fixation region formed in the fiber cushion body.

The apparatus may be configured to perform a welding operation using the laser radiation.

The apparatus may be configured to weld a fixation element to the fiber cushion body by the laser radiation. The fixation element may be a clip or another fixation element for a trim material.

The apparatus may alternatively or additionally be configured to weld a trim material directly to the fiber cushion body by the laser radiation.

The trim material may include thermoplastic material, e.g. thermoplastic fibers, or may be formed from thermoplastic material, e.g. thermoplastic fibers. The trim material may be directly welded to the fiber cushion body.

The apparatus may alternatively or additionally be configured to seal a surface of the fiber cushion body using the laser radiation. Thereby, good surface characteristics may be attained in an efficient way.

The apparatus may alternatively or additionally be configured to cut free fiber ends by the laser radiation. Such free fiber ends may be present at faces of the fiber cushion body, e.g. at faces which abut on molds during the manufacturing process. The free fiber ends projecting from a face of the fiber cushion body may be cut by the laser radiation so as to reduce the length by which they project from the face of the fiber cushion body.

An installation according to an embodiment is configured to form the fiber cushion body and includes an apparatus for processing the fiber cushion body using laser radiation.

The installation may comprise a filling station configured to insert the fibers into a mold.

The installation may comprise a thermal treatment station configured to thermally activate at least a fraction of the fibers.

The filling station may be configured to orient the fibers prior to supplying heat. Thereby, a fiber cushion body may be formed in which, in at least one zone of the fiber cushion body, the fibers have a preferential direction corresponding to a main load direction of the fiber cushion body. A desired soft feel touch and good breathability of the fiber cushion body may be attained.

The filling station may be configured to orient the fibers after insertion into the mold by adjusting the location and/or size of an area or of areas at which gas is drawn from the mold based on a filling level of fibers in the mold. Gas may be drawn from the mold over major faces of the mold, which are spaced along the direction which corresponds to the main load direction. Gas may be drawn from the mold at areas of the major faces of the mold which are respectively disposed lower than a current filling level of the fiber material in the mold.

The filling station may be configured to produce the fibers. The filling station may comprise a cutter configured to cut at least one yarn into segments and separating the segments into their filaments to form the fibers. The filling station may be configured to transport the fibers from a cutter to the mold using a gas flow, e.g. an air flow.

The installation may comprise an automatic transport system configured to supply a fiber cushion body to the apparatus for processing the fiber cushion body by laser radiation.

The installation may comprise an assembly station configured to install the fiber cushion body in one of a vehicle seat, office furniture or residential furniture. The fiber cushion body having at least one laser cut or laser weld may be installed in a automotive seat, an aviation seat, a train seat, or a public transportation seat. The fiber cushion body having at least one laser cut or laser weld may be installed in a seat for home or office seating.

Embodiments of the invention are operative to simplify the trimming technology of seats such as vehicle seats, office furniture or residential furniture. The integration off additional elements from material different from the fiber material of the upholstery is beneficial for recyclability.

In some embodiments, fixation elements made from the same base material as the upholstery itself can be recycled in the same process.

Variants of different trimming channel geometries and/or different other geometry sections in the upholstery can be made by a laser cutting or laser welding operation, thereby simplifying the production process.

Laser cutting techniques provide good precision of cuts, welds, and channels, which can be controlled precisely. Laser cuts and welds can be made at high operation speed, thus reducing cycle times.

Embodiments of the invention will be described with reference to the accompanying drawings.

DETAILED DESCRIPTION OF EMBODIMENTS

Exemplary embodiments of the invention will now be described with reference to the drawings. While some embodiments will be described in the context of specific fields of application, the embodiments are not limited to this field of application. Further, the features of the various embodiments may be combined with each other unless specifically stated otherwise.

While some embodiments will be described in the context of products which are cushions for vehicle seats, the apparatuses, systems and methods according to embodiments may also be used for forming other resilient products of a fiber material.

Figure 1:
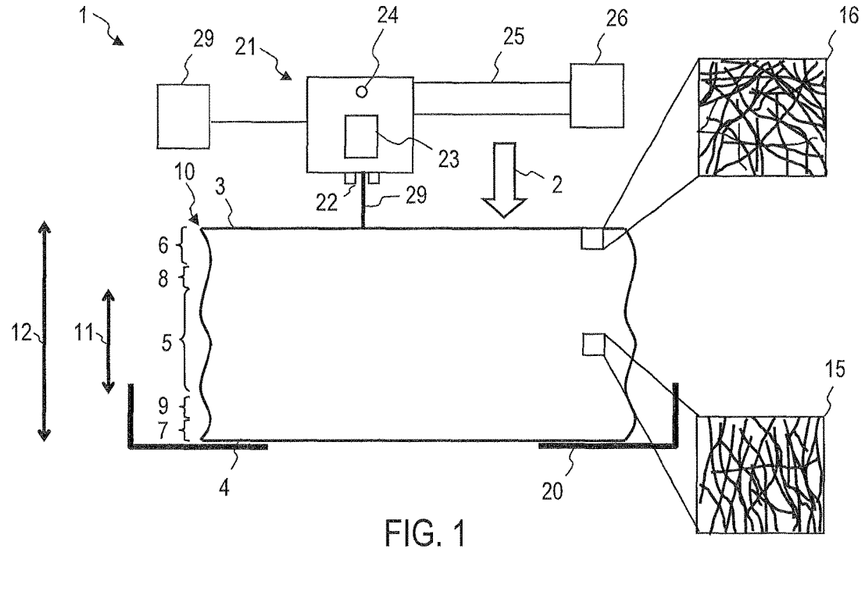
FIG. 1 is a schematic view of an apparatus according to an embodiment.

Referring to FIG. 1, a method and apparatus of processing a fiber cushion body will be explained.

FIG. 1 is a schematic cross-sectional view of a system 1 which includes a fiber cushion body 10 and an apparatus for processing the fiber cushion body by laser radiation. The apparatus includes a source of laser radiation, which may be implemented in a laser head 21. The apparatus comprises a receptacle 21 which retains the fiber cushion body 10 while it is being processed by laser radiation. The cross-sectional view of FIG. 1 is taken along a plane which is perpendicular to major faces of the fiber cushion body 10 and parallel to a main load direction 2 of the fiber cushion body 10.

Referring to FIG. 1, the fiber cushion body 10 which is treated in the method and apparatus according to an embodiment may be configured for use as a seat cushion. The fiber cushion body is configured to provide resilient characteristics when a force directed along a main load direction 2 is exerted onto the fiber cushion body 10.

The fiber cushion body 10 may be upholstery for supporting a user's thighs or back in a vehicle seat. The fiber cushion body 10 may be upholstery for seating or bedding furniture in residential or office use.

The fiber cushion body 10 has two major faces 3, 4 which are arranged so as to be opposite to each other on the fiber cushion body 10. The major faces 3, 4 may have an approximately planar shape, extending essentially perpendicularly to the main load direction 2. The fiber cushion body 10 may be configured such that the main load direction 2 defines a normal to the plane of the major faces 3 and 4.

The fiber cushion body 10 may be a unitary body which is integrally formed from thermally cross-linked fibers. The fiber material forming the fiber cushion body may include at least two different types of fibers, namely a binding fiber and a matrix fiber.

The binding fiber is a fiber which can be thermally activated by supplying heat thereto. Upon thermal activation, at least a portion of each binding fiber melts, thereby causing a matrix of fibers to form. Various known fiber types may be used as binding and matrix fibers. The fiber material from which the fiber cushion body is formed may include fibers that can be obtained from recycling material and/or which can be recycled in an efficient manner. The binding fibers may be bi-component (BiCo) fibers. The binding fibers may have a thermal activation temperature which is lower than a melting temperature of the matrix fibers. According to exemplary embodiments, the binding fibers may be BiCo fibers having a core of polyester or polyamide, and having a coating of polyamide or modified polyester. The BiCo fibers may have a trilobal shape in cross-section. The matrix fibers may be formed from polyester or polyamide and have a melting temperature higher than at least the melting temperature of the coating of the binding fibers. The matrix fibers may have a linear mass density of in between 10 and 100 dtex. The binding fibers may have a linear mass density of in between 7 and 40 dtex. The fiber material from which the fiber cushion body is formed may include more than one type of matrix fiber and/or more than one type of binding fiber.

The fiber cushion body 10 may include a plurality of different portions 5-7. The portions are distinguished from each other with regard to a characteristic fiber orientation and/or a density of the fiber cushion body 10. There are no sharp boundaries between the different portions. Rather, the fiber cushion body 10 may exhibit gradual transitions in fiber orientation or fiber cushion body density between the different portions.

The fiber cushion body 10 has a first portion 5 which may be a resilient portion 5. The resilient portion 5 has a fiber orientation corresponding to the main load direction 2 of the fiber cushion body. I.e., the preferential direction of the fibers in the resilient portion corresponds to the main load direction 2 and is perpendicular to at least one major face 3 of the fiber cushion body 10. Due to the formation of the fiber matrix, fiber shapes and statistical distributions in fiber orientation, not all fiber fibers will be directed along the main load direction 2 in the resilient portion. The resilient portion 5 may be considered to have a fiber orientation along the main load direction 2 if more than 50% of the fibers are respectively oriented at an angle of less than 45° to the main load direction 2. In other words, in the resilient portion 5, the majority of fibers is disposed at angle of more than 45° relative to the plane of the major face 3.

The fiber configuration in the resilient portion 5 is schematically indicated at the inset 15. As seen in the inset 15, a majority of the fibers in the resilient portion 5 may be oriented at an angle of less than 45° to the main load direction 2. The fiber spacing may be sufficiently large so as to allow the fibers to deflect when a load directed along the main load direction 2 is applied onto the fiber cushion body. Cross-linking fibers, which interconnect the fibers which are mainly disposed parallel to the main load direction 2, allow a fiber matrix to be formed in the resilient portion 5.

The fiber cushion body 10 may also includes at least one second portion 6, 7 disposed at the major faces 3 and 4, respectively. The at least one second portion 6 and 7, respectively, are distinguished from the resilient portion 5 with regard to at least one of fiber orientation or fiber cushion body density. In the fiber cushion body 10 of FIG. 1, the fibers in the at least one second portion 6 and 7 respectively have a preferential direction parallel to the plane of the major face at which they are disposed. The density of the fiber cushion body at the major faces 3 or 4 may be greater than a density in the resilient portion 5. Alternatively, such an increased density may also be generated in the treatment using ultrasonic energy.

The fiber configuration in the further portion 6 disposed at the major face 3 is schematically indicated at the inset 16. As seen in the inset 16, a majority of the fibers in the portion 6 may be oriented at an angle of less than 45° to the plane of the major face 3, and the fibers may have a packing density greater than in the resilient portion 5. The further portion 7 disposed on the other major face 4 may have a configuration, with regard to fiber orientation and fiber cushion body density, which is similar to the one in the portion 6.

The fiber cushion body 10 may be formed in a unitary manner. The fiber cushion body 10 may exhibit gradual transitions in fiber orientation and density between the resilient portion 5 and the at least one second portion 6 and 7, respectively. The fiber cushion body 10 may comprise a transition portion 8 which is disposed in between the resilient portion 5 and the second portion 6 on the major face 3. In the transition portion 8, the fiber orientation may vary gradually from the fiber orientation of the resilient portion 5 to the fiber orientation of the second portion 6 on the major face 3. Alternatively or additionally, the density of the fiber cushion body may vary gradually from the density of the resilient portion to the density of the further portion 6 on the major face 3.

The fiber cushion body 10 may comprise a transition portion 9 which is disposed in between the resilient portion 5 and the second portion 7 on the major face 4. In the transition portion 9, the fiber orientation may vary gradually from the fiber orientation of the resilient portion 5 to the fiber orientation of the further portion 7 on the major face 4. Alternatively or additionally, the density of the fiber cushion body may vary gradually from the density of the resilient portion 5 to the density of the further portion 7 on the major face 4.

The fiber cushion body 10 thus formed as a unitary three-dimensional body has a height 12 which may be greater than 4 cm. The resilient portion 5 has a height 11 and may be disposed so as to be spaced from both major faces 3 and 4.

In the fiber cushion body 10, the resilient portion 5 having the fiber orientation along the main load direction 2 provides good ventilation and resiliency. With the fiber cushion body 10 being formed in a unitary manner from thermally cross-linked fibers, good durability and comfort are attained.

As will be explained in more detail with reference to FIG. 1 to FIG. 15 in the following, the fiber cushion body 10 is processed by applying laser radiation thereto. The various characteristics described with reference to FIG. 1 for the fiber cushion body may be retained by the treatment using laser radiation which will be described next.

The apparatus and method may be used for various purposes. For illustration, the method and apparatus according to an embodiment may be used to make geometry modifications on fiber cushion bodies by performing a laser cutting and/or laser welding operation. A laser cutting operation allows a variety of different geometries to be produced in a precise way. For illustration, a neutral cushion can be produced by a 3D-shaping method without trimming channels. The channels can be produced in a post-processing operation by using a controllable laser.

If the laser device is unable to reach a cutting location directly, the laser beam can be redirected by one or several optical elements, which may include lenses and/or mirrors or other beam deflection elements. An orientation of the cut as needed by the part geometry may be attained thereby. Undercuts and/or hidden cuts may be formed.

Alternatively or additionally, fixation points for separate elements can be produced by laser welding operations. Clips or other fixation elements can be welded on a surface of the fiber cushion body so as to produce a strong connection between the fiber and the material of the additional element. This allows for reinforcement elements to be placed and fixed on the surface of the fiber cushion body. Alternatively or additionally, any connector for assembly processes may be welded to the fiber cushion body. Examples for such connectors include connectors for trimming assembly, connectors for assembly of the cushion to the frame of the seat, connectors for assembly of comfort elements to the cushion and others.

Another application of the laser welding of fiber upholstery is the fixation of trim materials directly on the surface of the fiber cushion body. If trim materials from thermoplastic fiber are used, the trim material may be directly welded to trim regions so as to be in direct contact with the fiber upholstery surface. This also allows facilitates keeping the trim material in place on concave surfaces.

If welding points are in a visible area, the welding points can be shaped by laser welding in a way, that they can serve as decorative elements on the trim surface.

The laser can alternatively or additionally be used to produce channels on a B-side of the parts to assemble wire mats, trim wires or similar suspension or fixation elements. It is not necessary to insert such wire mats or trim wires into the mold when the fiber cushion body is formed. Such elements can be fixed to the fiber structure by welding with the laser.

FIG. 1 shows an apparatus according to an embodiment which is configured to form at least one laser cut or laser weld in the fiber cushion body 10. The apparatus 10 may include a laser head 21. The laser head 21 may have a plurality of degrees of freedom. The laser head 21 may be mounted so as to be pivotable about at least three axes. One pivot axis 24 is schematically shown in FIG. 1. The laser head 21 may be mounted to a five-axis robot.

The laser head 21 may be mounted to a support 25. The apparatus may comprise a actuator 26 configured to displace the laser head 21 relative to the fiber cushion body 10 received in the receptacle 20 of the apparatus. More than one actuator 26 may be provided to effect a relative translatory displacement and/or a pivoting motion between the laser head 21 and the fiber cushion body 10.

The laser head 21 may act as a source of laser radiation 29. The laser head 21 may have an exit opening through which laser radiation 29 exits the laser head 21. A laser 23 may be physically mounted in the laser head 21 or may be coupled to the laser head 21 via an optical fiber.

A control device 19 of the apparatus may control the laser 23 and/or the at least one actuator 26 to perform laser cutting or laser welding operations in which the laser radiation 29 is directed onto the fiber cushion body 10. The position at which laser cuts and/or laser welds are formed on the fiber cushion body 10 may thereby be controlled. The orientation in which cuts and/or laser welds extend on the fiber cushion body 10 may be controlled.

The laser radiation 19 may be applied to the fiber cushion body 10 so as to extend from the second portion 6 at the surface 3 into the first portion 5 which provides the resilient characteristics of the fiber cushion body 10. This allows walls of cuts or channels formed in the fiber cushion body 10 by laser radiation to be consolidated by laser radiation, even when they extend to the region in which the fibers have a preferential orientation along the main load direction 2. Further, attachment features or channels may be recessed into the first portion 5, so as to be spaced from the surface 3 against which a user's body may rest.

Figure 2:
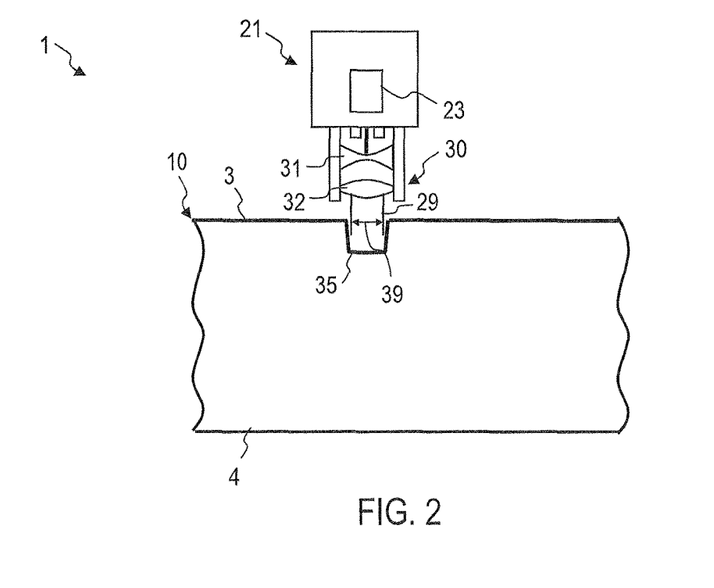
FIG. 2 is a schematic view of an apparatus according to an embodiment.

The apparatus according to embodiments may be configured for insertion of at least one optical element along a beam path of the laser radiation, as illustrated in FIG. 2.

FIG. 2 shows the apparatus according to an embodiment in which at least one optical element 31, 32 is positioned along the laser beam path of the laser radiation. The at least one optical element 31, 32 may comprise one lens or a plurality of lenses. The at least one optical element 31, 32 may be mechanically supported on the laser head 21.

The at least one optical element 31, 32 may be attached to a mount 30. The mount 30 may be configured for displaceable attachment to the laser head 21. The mount 30 may be releasably coupled to the laser head 21.

The mount 30 may be coupled to an actuator of the laser head 21 to displace the at least one optical element 31, 32. The at least one optical element 31, 32 may thus be used to selectively manipulate a diameter, direction, convergence or divergence angle of the laser radiation 29.

FIG. 2 shows the apparatus when the at least one optical element 31, 32 is positioned so as to increase a diameter of a laser beam output by the laser head 21. The laser radiation 29 may have a diameter 39. The diameter 39 may be set based on a diameter of a channel 35. The channel 35 is formed by the laser radiation 29. The diameter 39 may be set to match the diameter of the channel 35, so that the channel 35 may be rapidly formed.

While only one channel 35 is shown in FIG. 2, the methods and apparatuses may be used to form a plurality of channels 35 in the fiber cushion body.

A trim material may be attached to the fiber cushion body 10 in the channel 35. The trim material may be welded directly to the fiber cushion body 10 in the channel 35, so that a laser weld is formed in the channel 35. Alternatively or additionally, a fastening member for the trim material may be welded to the fiber cushion body in the channel 35. The fastening member may also be formed from fiber material to improve recyclability.

The channel 35 may be used for other purposes, e.g. for attachment of connectors which connect the fiber cushion body 10 for assembly. Examples for such connectors include connectors for trimming assembly, connectors for assembly of the cushion to the frame of the seat, connectors for assembly of comfort elements to the cushion and others.

Figure 3:
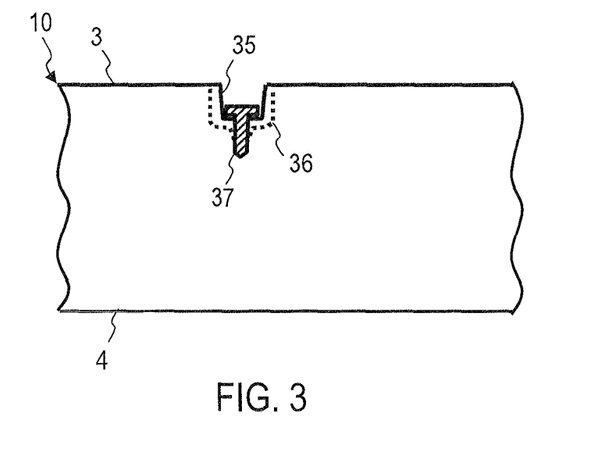
FIG. 3 is a cross-sectional view of a fiber cushion body according to an embodiment.

FIG. 3 is a cross-sectional view of the fiber cushion body 10 treated by laser radiation 29.

A face 3 of the fiber cushion body 10 includes at least one recess which may be formed as a channel 35. Different recesses may be formed so as to have different shapes. The recesses may respectively have a wall which is formed as a laser cut. A recess may have a cuboid shape, a conical shape, or a triangular cross-section.

A zone 36 in which the fiber material is consolidated so as to provide higher rigidity may be formed at at least one face of the channel 35. The zone 36 may be formed by laser cutting or laser welding. A connector 37, such as a threaded bolt, may be brought into threaded engagement with the zone 36. Such increased rigidity zones at lateral faces of the channel 35 may be formed by supplying laser radiation to the fiber cushion body as the channel 35 is cut.

Other connectors or fastening member may be attached to a zone of the fiber cushion body 10 which is treated by laser radiation. For illustration, a tree connector having an outer diameter larger than an inner diameter of a recess may be brought into engagement with the fiber cushion body 10.

The connector(s) 36 may have any one of a variety of functions, such as connecting the fiber cushion body 10 to a structural element or fastening a cover material to the fiber cushion body 10.

Figure 4:
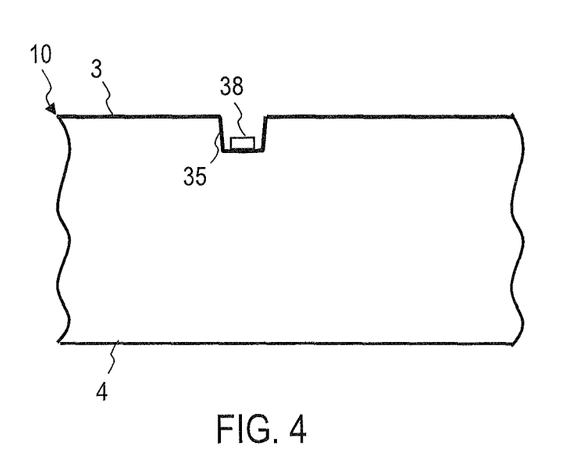
FIG. 4 is a cross-section view illustrating an ultrasonic processing step performed by the apparatus according to an embodiment.

The apparatus according to embodiments may be configured to use ultrasonic energy in addition to laser radiation to process the fiber cushion body 10. For illustration, ultrasonic waves may be applied to a face of the fiber cushion body 10 which was cut using the laser radiation 29.

FIG. 4 is a cross-sectional view of the fiber cushion body 10 treated by laser radiation 29 in combination with ultrasonic energy.

A channel 35 or other recess may be cut using laser radiation. A sonotrode 38 of the apparatus may be used to apply ultrasonic energy to at least one laser cut face of the channel 35. The sonotrode 38 may be pressed against a bottom of the channel 35 cut by laser radiation, to further consolidate the bottom of the channel 35.

Figure 5:
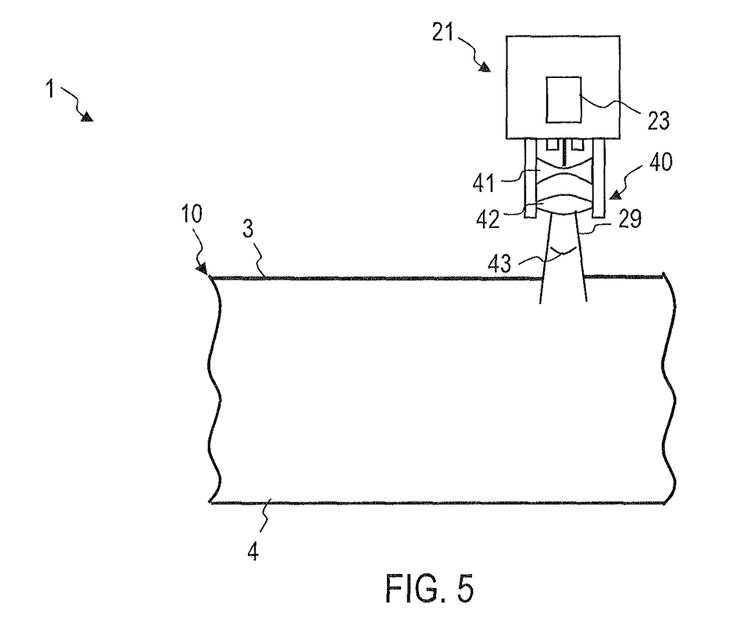
FIG. 5 is a schematic view of an apparatus according to an embodiment.

The apparatus according to embodiments may be used to form flaring recesses, e.g. flaring channels, undercuts or other geometrical features having a complex geometry in the fiber cushion body 10.

FIG. 5 shows the apparatus according to an embodiment which is configured to cut a flaring channel into the fiber cushion body. The apparatus may be configured to produce the laser radiation 29 as a divergent beam. An opening angle 43 of the laser radiation 29 may be controlled by the apparatus as a function of the geometry of the channel which is to be cut.

The flaring channel which is formed in the fiber cushion body 10 may be a trim channel.

At least one optical element 41, 42 may be positioned in the beam path of the laser radiation to form the divergent laser beam. The at least one optical element 41, 42 may comprise one lens or a plurality of lenses. The at least one optical element 41, 42 may be mechanically supported on the laser head 21.

The at least one optical element 41, 42 configured to form the divergent laser beam may be attached to a mount 40. The mount 40 may be configured for displaceable attachment to the laser head 21. The mount 40 may be releasably coupled to the laser head 21.

The mount 40 may be coupled to an actuator of the laser head 21 to displace the at least one optical element 41, 42. The at least one optical element 41, 42 may thus be used to selectively manipulate a diameter, direction, convergence or divergence angle of the laser radiation 29.

Figure 6:
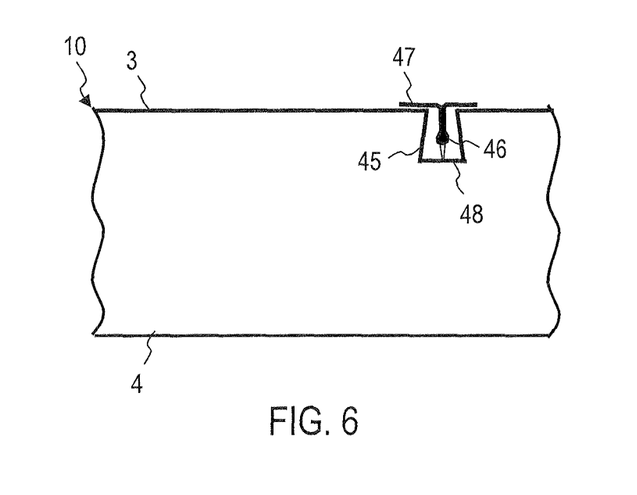
FIG. 6 is a cross-sectional view of a fiber cushion body according to an embodiment.

The laser radiation 29 may be used to form a flaring channel 45 in the fiber cushion body, as illustrated in FIG. 6. The flaring channel 45 may flare from a surface 3 of the fiber cushion body 10 towards an interior of the fiber cushion body 10. The flaring channel 34

FIG. 6 is a cross-sectional view of the fiber cushion body 10 processed by laser radiation 29. A flaring channel 45 or other flaring recess may be cut using laser radiation. The flaring channel 45 has a first width at the surface 3 and a second width at a bottom 48. The second width may be greater than the first width.

A fixation element 46 may be attached to the bottom 48 of the flaring channel 45. The fixation element 46 may be configured for securing a trim material 47 thereon. The fixation element 46 may be attached to the bottom 48 of the flaring channel 45 by laser welding. Other attachment techniques may be used to secure the fixation element 46 to the fiber cushion body 10. At least a portion of the fixation element 46 may be recessed into the fiber cushion body 10. The complete fixation element 46 may be arranged with the channel 45 so as to be recessed from the surface 3 of the fiber cushion body 10 on which the trim material 47 extends.

The fixation element 46 may also be formed form fiber material. The fixation element 46 may be formed from fibers which comprise thermoplastic fibers. Recyclability of the fiber cushion body 10 with the trim material provided thereon may thereby be improved.

Additionally or alternatively to providing fixation elements 46 in trim channels 45, the trim material 47 may be directly welded to one surface 3 or plural surfaces of the fiber cushion body 10.

Figure 7:
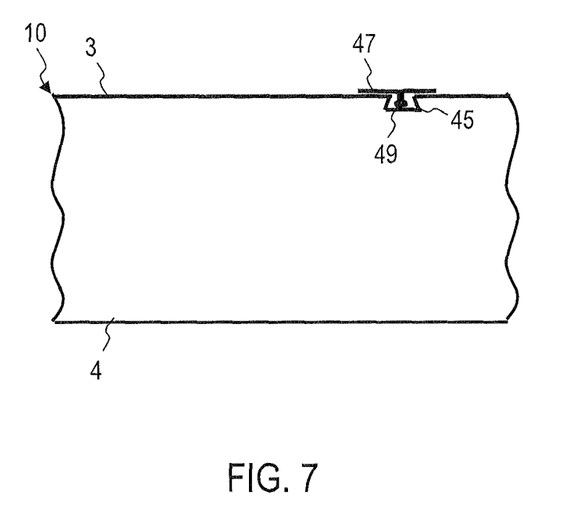
FIG. 7 is a cross-sectional view of a fiber cushion body according to an embodiment.

FIG. 7 is a cross-sectional view of the fiber cushion body 10 processed by laser radiation 29. A trim material 47 is directly welded to the fiber cushion body 10 by the laser radiation 29. The fiber cushion body 10 has a laser weld 49, which may be a welded seam, which interconnects the fiber cushion body 10 and the trim material 47.

The trim material 47 may include thermoplastic material, e.g. thermoplastic fibers, or may be formed from thermoplastic material, e.g. thermoplastic fibers. The trim material 47 may be directly welded to the fiber cushion body so that the trim material 47 and fibers of the fiber cushion body 10 are fused with each other at the laser weld 49.

The laser weld 49 may be formed so as to be recessed in the fiber cushion body 10.

The laser weld 49 may be arranged in a trim channel 45 which may be formed by laser cutting.

One or several laser weld(s) 49 used to directly attach the trim material 47 to the fiber cushion body 10 may be arranged at an outer surface 3, 4 of the fiber cushion body 10. The laser weld(s) 49 which attach the trim material 47 directly to the fiber cushion body 10 may be formed so as to provide a decorative pattern. The apparatus according to an embodiment may be configured to form the plurality of laser welds 49 having a geometric arrangement visible on an outer surface of the fiber cushion body 10.

Figure 8:
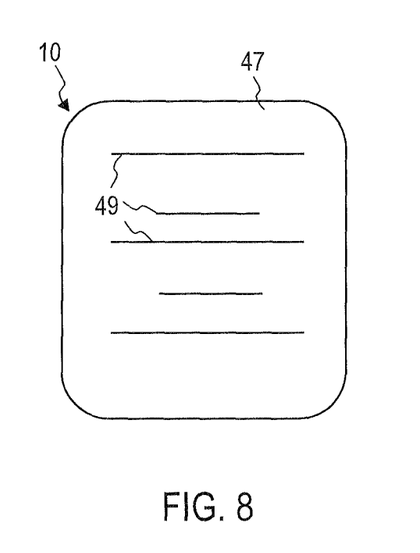
FIG. 8 is a plan view of a fiber cushion body according to an embodiment.

FIG. 8 is a schematic plan view of the fiber cushion body 10 with the trim material 47 attached thereto by laser welding.

A plurality of laser welds 46 may be formed by the method or apparatus according to an embodiment. The arrangement of the plurality of laser welds 46 may be predefined and may be stored in a storage device of the control device 19. The control device 19 of the apparatus may control the actuator(s) of the laser head 21 and/or the laser 23 so as to form the laser welds 46 with the pre-defined pattern.

The plurality of laser welds 46 may be formed so as to securely retain the trim material 47 on the fiber cushion body 10. The plurality of laser welds 46 may comprise laser welds which are spaced from each other. At least some of the laser welds 46 may extend parallel to each other in a spaced relationship.

In the methods and apparatuses according to any one of the embodiments, a gas may be blown onto the region at which the laser radiation is applied to the fiber cushion body 10. The gas may be blown onto the region while the laser radiation concurrently impinges on the fiber cushion body.

The same location on the surface of the fiber cushion body 10 may be concurrently exposed to laser radiation 29 and a flow of gas.

A gas flow may be used when laser cuts are formed by the laser radiation. A gas flow may additionally or alternatively be used when laser welds are formed by the laser radiation.

The gas flow may be a flow of air. The gas flow may be a flow of protection gas, e.g. nitrogen.

Good characteristics may be attained for the fiber cushion body 10 processed by laser radiation 29 when applying the gas flow concurrently with laser processing. The formation of coarse-grained granular structures at the laser cut or laser weld may be reduced.

The application of gas may be performed selectively, depending on the location and/or type of laser cut or laser weld which is being formed. For illustration, for laser cuts or laser welds on a B-side surface of the fiber cushion body which faces away from the user's skin, it may not be required to apply gas when forming laser cuts and/or laser welds. For recessed laser welds or laser cuts, it may not be required to apply gas when forming laser cuts and/or laser welds.

Figure 9:
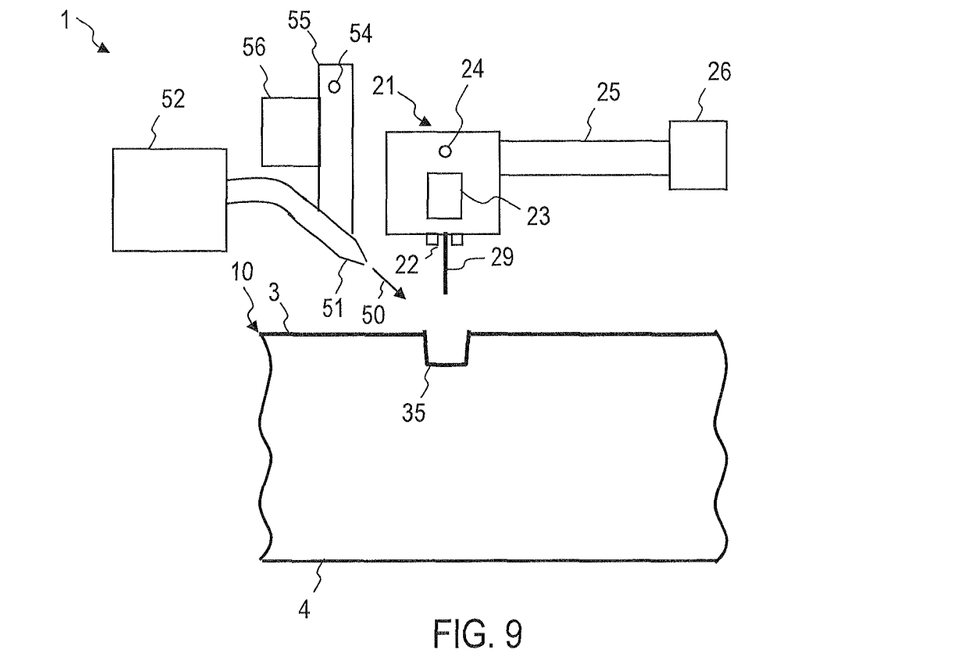
FIG. 9 is a schematic view of an apparatus according to an embodiment.

FIG. 9 shows an apparatus according to an embodiment which is configured to form at least one laser cut or laser weld in the fiber cushion body 10. The apparatus 10 may include a laser head 21. The apparatus may have any one of the configurations explained with reference to FIG. 1 to FIG. 8 above.

The apparatus is further configured to generate a flow of gas 50. The flow of gas 50 may be directed onto the location at which laser radiation 29 impinges on the fiber cushion body 10.

The flow of gas 50 may be a flow of air. The apparatus may include a reservoir 51 of pressurized air, from which air is drained to generate the flow of gas 50. Alternatively or additionally, a compressor may be used to generate the flow of gas 50. The flow of gas 50 may be a flow of protection gas. The gas which is directed onto the location at which laser radiation 29 impinges on the fiber cushion body 10 may be a protection gas, e.g. an inert gas. The protection gas may be nitrogen. The reservoir 51 may be a reservoir of protection gas which is drained to generate the air flow.

The apparatus may comprise a flow guide to direct the gas flow onto the location at which laser radiation impinges onto the fiber cushion body 50. The flow guide may comprise a nozzle 51. The nozzle 51 may be mounted so as to be displaceable relative to the receptacle in which the fiber cushion body 10 is retained. The nozzle 51 may be mounted so as to be displaceable relative to both the receptacle in which the fiber cushion body 10 is retained and the laser head 21.

The nozzle 51 may be mounted for a pivoting and/or translatory displacement. The nozzle 51 may be supported on a mount 55 which may be pivotable about at least one pivot axis 54.

The apparatus may comprise an actuator 56 for displacing the nozzle 51. The actuator 56 may be configured to displace the nozzle 51 relative to the fiber cushion body 10 and/or relative to the laser head 21.

The control device 19 of the apparatus may be configured to displace the nozzle 51 in dependence on a position and/or orientation of the laser head 21. The control device 19 of the apparatus may be configured to displace the nozzle 51 in dependence on a position and/or orientation of the laser head 21 and in dependence on a size and/or shape of the fiber cushion body 10. The control device 19 of the apparatus 19 may be configured to control the actuator 56 such that the flow of gas 50 is directed onto the location at which the laser radiation 29 impinges onto the fiber cushion body 10.

Figure 10:
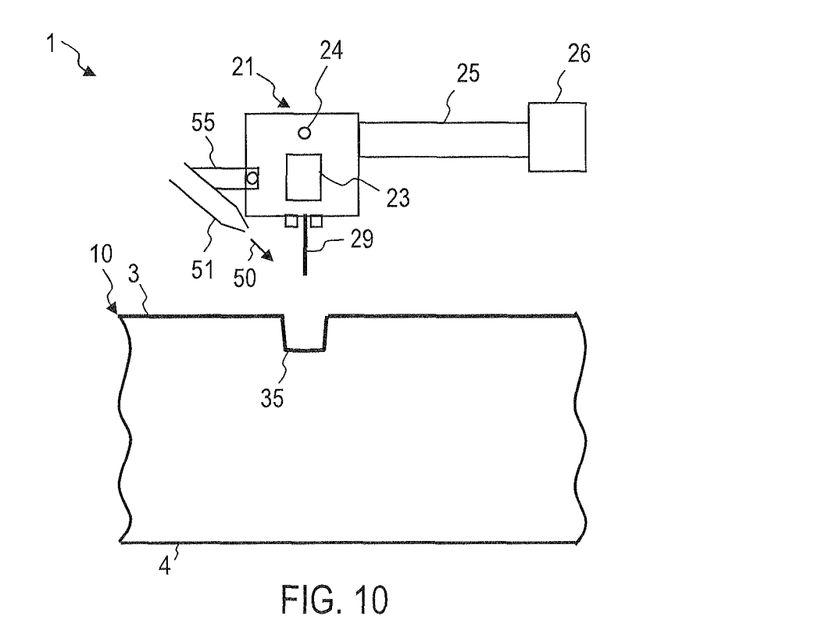
FIG. 10 is a schematic view of an apparatus according to an embodiment.

FIG. 10 shows an apparatus according to an embodiment which is configured to form at least one laser cut or laser weld in the fiber cushion body 10. The apparatus 10 may include a laser head 21. The apparatus may be configured to generate a flow of gas 50 as explained with reference to FIG. 9. The apparatus may have any one of the configurations explained with reference to FIG. 1 to FIG. 9 above.

The nozzle 51 which directs the gas flow 50 onto the fiber cushion body 10 may be supported on the laser head 21. The nozzle 51 may be displaceably supported on the laser head 21. An actuator configured to displace the nozzle 51 relative to the laser head 21 may be provided on the laser head 21.

The control device 19 of the apparatus may be configured to displace the nozzle 51 in dependence on a position and/or orientation of the laser head 21. The control device 19 of the apparatus may be configured to displace the nozzle 51 in dependence on a position and/or orientation of the laser head 21 and in dependence on a size and/or shape of the fiber cushion body 10. The control device 19 of the apparatus 19 may be configured to control the actuator 56 such that the flow of gas 50 is directed onto the location at which the laser radiation 29 impinges onto the fiber cushion body 10.

Figure 11:
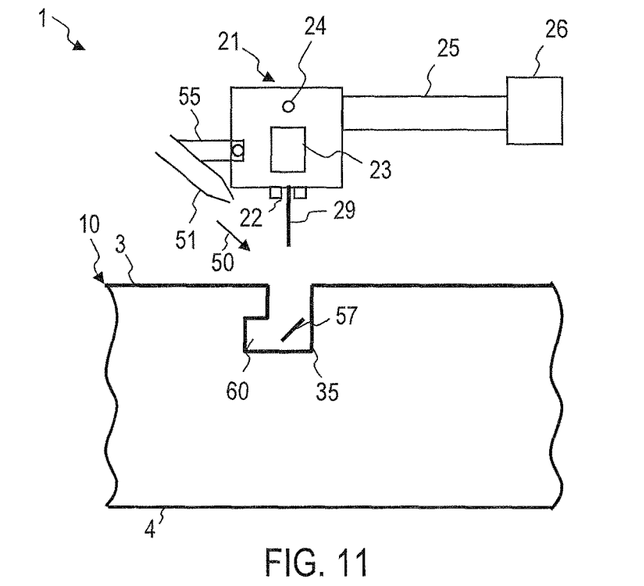
FIG. 11 is a schematic view of an apparatus according to an embodiment.

FIG. 11 shows an apparatus according to an embodiment which is configured to form at least one laser cut or laser weld in the fiber cushion body 10. The apparatus 10 may include a laser head 21. The apparatus may be configured to generate a flow of gas 50 as explained with reference to FIG. 9. The apparatus may have any one of the configurations explained with reference to FIG. 1 to FIG. 10 above.

The apparatus may be configured to form an undercut 60 in the fiber cushion body. The apparatus may be configured to deflect the laser radiation 29 so as to form the undercut.

The apparatus may be configured to insert an optical element 57 into a beam path of the laser radiation which deflects the laser radiation 29 to form the undercut 60. The optical element 57 may be attached to the laser head 21 via a mount (not shown in FIG. 11). The optical element 57 may be displaceably mounted to the laser head 21 so as to be selectively inserted into the beam path. The optical element 57 may be a mirror or another reflector.

The apparatus may be configured to displace the optical element 57 jointly with the laser head 21 as the channel 35 having the undercut 60 is formed. A channel having the undercut 60 extending therefrom may be formed in this way.

The formation of one or several undercut(s) in the fiber cushion body 10 may have various benefits associated therewith. For illustration, rigid elements and/or laser welds may be positioned so as to be hidden from view. A layer of the fiber cushion body which extends above the undercut may provide a cushioning effect so that rigid elements or laser welds cannot be easily felt by a seat occupant. Durability of connections between the fiber cushion body and elements positioned in the undercut 60 may be improved.

In any one of the various embodiment, zones having increased density and/or rigidity may be selectively formed along at least a portion of a channel 35 in the fiber cushion body by controlling the power density of the laser radiation 29 and/or the duration for which the laser radiation 29 is applied.

Figure 12:
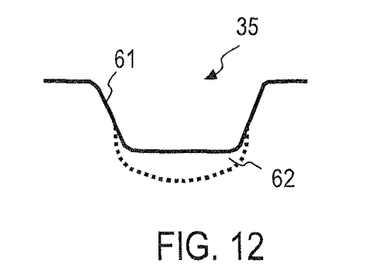
FIG. 12 is a schematic cross-sectional view of a fiber cushion body according to an embodiment.

FIG. 12 illustrates a cross-sectional view of a fiber cushion body which may be formed when increased laser power and/or increased laser dwell time is used for forming a bottom of a channel 35. Side wall faces 61 of a recess 35 formed in the surface of the fiber cushion body may be sealed by the laser radiation, while the density and/or rigidity of the material may remain lower than that in a zone 62 concentrated around the bottom face of the recess 35.

Figure 13:
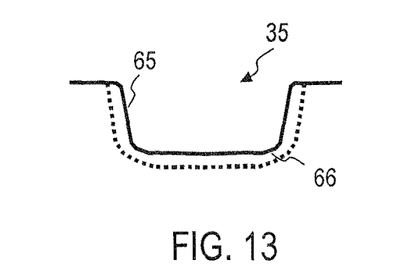
FIG. 13 is a schematic cross-sectional view of a fiber cushion body according to an embodiment.

FIG. 13 illustrates a cross-sectional view of a fiber cushion body which may be formed when side wall faces 65 of the channel 35 are subject to increase laser power and/or increased laser dwell time. A zone 66 in which the density and/or rigidity of the fiber cushion body is increased may be formed so as to extend along both the bottom face and the side wall faces 65 of the channel 35.

The post-processing of a fiber cushion body by laser radiation may be combined with the production of the fiber cushion body from loose fiber material. The apparatus according to an embodiment may be mounted in an installation which includes a filling station configured to fill fiber material into a mold and, optionally, to orient the fiber material within the mold. The installation may include a thermal treatment station. The thermal treatment station may be configured to thermally activate at least binding fibers of the fiber material. The installation may include an apparatus for post-processing the fiber cushion body according to an embodiment. Methods and installations of this kind will be described in more detail with reference to FIG. 14 and FIG. 15.

Figure 14:
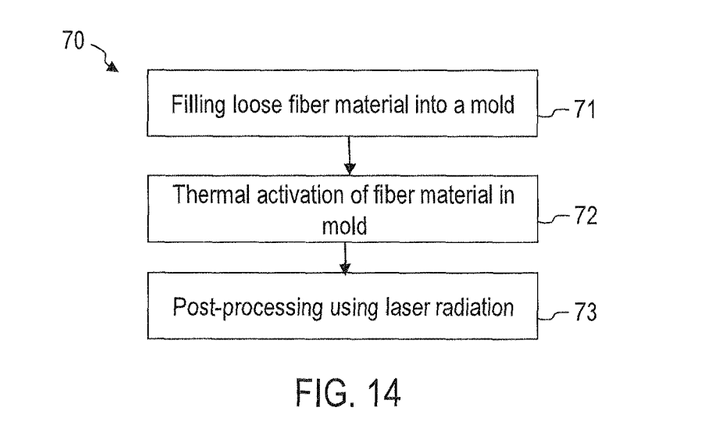
FIG. 14 is a flow chart of a method according to an embodiment.

FIG. 14 is a flow chart of a method 70 according to an embodiment. The method 70 may be automatically performed by an apparatus or installation according to an embodiment, which is configured to process a fiber cushion body using laser radiation.

At 71, loose fiber material may be inserted into a mold. The loose fiber material may consist of single-filament fibers or flocks of fibers. The loose fiber material may be such that it does not include thermally cross-linked fibers.

The loose fibers may include matrix fibers and binding fibers. The binding fibers may be BiCo fibers. At least a fraction of the binding fibers may be thermally activatable at a temperature which is lower than a melting temperature of the matrix fibers.

A cutter system may be operated to cut segments from one or several yarns to form the fibers. The segments of yarn may be opened to individual segments of filaments. Opening of segments of yarns may be performed in an airflow which transports the fibers from the cutter system to the mold.

The fibers may be oriented within the mold. A gas flow pattern through at least one face of the mold may be controlled to orient the fibers within the mold. A location at which gas is withdrawn from the mold may be varied as a function of filling level of fibers in the mold.

Orienting the fibers within the mold may comprise withdrawing the gas from the mold through at least one nozzle.

At 72, at least a fraction of the fiber material in the mold may be thermally activated to form the fiber cushion body. For illustration, for fiber material which includes matrix fibers and binding fibers, at least a portion of the binding fibers may be thermally activated to attain thermal cross-linking. For binding fibers which are BiCo fibers having a low melt component and a high melt component, the high melt component having a melt temperature higher than the low melt component, at least the low melt component of the BiCo fibers may be thermally activated.

At 73, the fiber cushion body formed from cross-linked fibers is processed using laser radiation. A laser cut and/or a laser weld may be formed in the fiber cushion body. The processing may be implemented using any one of the techniques or devices described with reference to FIG. 1 to FIG. 13.

At 73, the laser radiation may be applied to the fiber cushion body to form at least one channel in the fiber cushion body. Alternatively or additionally, the laser radiation may be applied to the fiber cushion body to seal at least one surface of the fiber cushion body. Alternatively or additionally, the laser radiation may be applied to the fiber cushion body to set an external contour in dependence on a geometry of a seat or furniture in which the fiber cushion body is to be used. Alternatively or additionally, the laser radiation may be applied to the fiber cushion body to form a weld on the fiber cushion body. The weld may be used for affixing a rigid member, such as a clip, or a trim material to the fiber cushion body.

Figure 15:
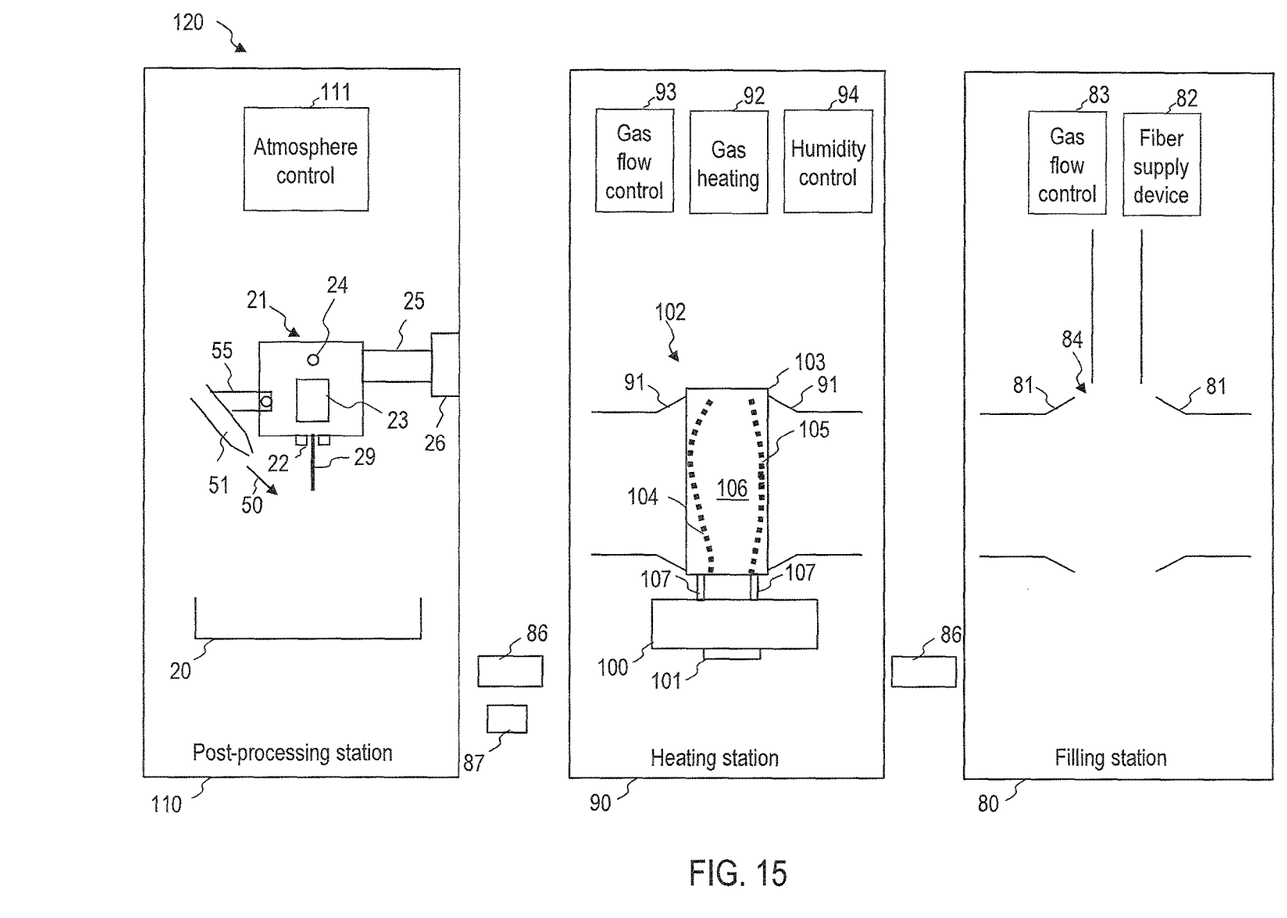
FIG. 15 is a schematic view of an installation according to an embodiment.

FIG. 15 shows an installation 120 according to an embodiment. The installation 120 is configured to form a fiber cushion body and to process the fiber cushion body using laser radiation.

The installation 120 may comprise a tool 102. The tool 102 may comprise a mold 103 defining a cavity 106 in which fibers are received. The mold 103 may be supported on a holder 100. The holder 100 may be mechanically coupled to the mold 103 via connectors 107. The connectors 107 may have a thermal resistance which reduces heat flow between the mold 103 and the holder 100.

The installation 120 may comprise processing stations. For illustration, the installation 120 comprises a filling station 80 in which fiber material is supplied into a cavity of the tool 102. The installation 120 may comprise one or several thermal treatment stations for thermal treatment of the fiber material received in the cavity of the tool 102. The several treatment stations may comprise a heating station 90 and/or a cooling station.

The filling station 80 may be configured to fill a fiber material which comprises a blend of binding fibers and filling fibers into the mold 103 of the tool 102.

The filling station 80 may comprise a filling station adapter 81 which couples to the mold 103. The filling station adapter 81 may be configured to direct a gas flow between the mold 103 and at least one gas duct. The filling station adapter 81 may be configured to prevent the gas flow from impinging onto the holder 100 of the mold 102. The filling station adapter 81 may comprise a baffle which extends between the holder 100 and the mold 103 when the tool 102 is positioned in the filling station 80 and the filling station adapter 81 engages the mold 103.

The filling station 80 may comprise a fiber supply device 82. The fiber supply device 82 may be configured to provide fiber material in the form of loose fibers or flocks of fibers into the mold 103. In some implementations, the fiber supply device 82 may comprise a cutter device to cut at least one yarn into segments to form the fiber material 3.

The fiber material may comprise binding fibers and matrix fibers. In the mold 103, at least the binding fibers may be thermally activated when the tool 102 is positioned in a thermal treatment station 90. The fiber cushion body may be formed as an integral body of cross-linked fibers. Cross-linking may be attained by thermal activation of the binding fibers. The fiber cushion body may be formed such that the fibers in at least a portion of the seat cushion body are predominantly oriented along a preferential direction which may correspond to the load direction of the fiber cushion body.

To orient the fibers in the product, the filling station 80 may comprise a gas flow control 83. The gas flow control 83 may generate a gas flow which passes through the mold 103 and which orients the fibers in the mold 103 such that, in at least a portion of the product, the fibers are predominantly oriented along the main load direction. Gas passages may be formed in major faces 104, 105 of the mold 103 which define a cavity 106 for receiving the fibers therebetween.

The fiber material from which the seat cushion body is formed may include fibers that can be obtained from recycling material and/or which can be recycled in an efficient manner. The binding fibers may be bi-component (BiCo) fibers. The binding fibers may have a thermal activation temperature which is lower than a melting temperature of the filling fibers.

According to exemplary embodiments, the binding fibers may be BiCo fibers having a core of polyester or polyamide, and having a coating of polyamide or modified polyester. The BiCo fibers may have a trilobal shape in cross-section. The filling fibers may be formed from polyester or polyamide and have a melting temperature higher than at least the melting temperature of the coating of the binding fibers.

The filling fibers may have a linear mass density of in between 80 and 100 dtex. The binding fibers may have a linear mass density of in between 7 and 40 dtex. The fiber material from which the seat cushion body is formed may include more than one type of filling fiber and/or more than one type of binding fiber.

The mold 103 with the fiber material received therein may be displaced from the filling station 80 for thermal activation of the binding fibers. The installation 120 may cause the filling station adapter 81 to disengage from the mold 103. The filling station adapter 81 may be withdrawn from the mold 103 to allow the tool 102 with the fiber material received in the mold 103 to be displaced from the filling station 80 to at least one thermal treatment station. The mold 103 may be positioned again in a receptacle 84 of the filling station 80 once the fiber cushion body has been removed from the mold 103.

A transport feature 101 of the tool 102 may be configured for at least selective engagement with a transport mechanism 86 of the installation 120. The transport system 86 may be configured to transport the tool 102 from the filling station 80 to further processing stations which include a post-processing station 110 for applying laser radiation to the fiber cushion product.

A control device 87 of the installation 120 may control transport mechanism 86 to displace the tool 102 from the filling station 80 to the heating station 90. The heating station 90 defines receptacle for receiving the tool 102 therein.

The heating station 90 may be configured to thermally activate the binding fibers for thermal cross-linking. The heating station 90 may comprise a heating station adapter 91, a heating device 92 for heating a gas, and a gas flow control device 93 for controlling a gas flow through the mold 103 when the tool 102 is positioned at the heating station 90.

The heating station 90 may comprise an air humidity control device 94 to control air humidity during thermal activation of the binding fibers.

A cooling station may be provided to cool the fiber cushion product before it is removed from the tool 102.

A processing station 110 for post-processing the fiber cushion body using laser radiation may be provided. The processing station 110 may include an apparatus for processing the fiber cushion body which may have any one of the configurations described with reference to FIG. 1 to FIG. 14. The processing station 110 may be configured to form at least one laser cut and/or at least one laser weld on the fiber cushion body.

The processing station 110 may comprise an atmosphere control 111. The atmosphere control 111 may be configured to control an air humidity and/or a temperature of an atmosphere while the fiber cushion body is processed using laser radiation.

The transport mechanism 86 may position the tool 102 sequentially at the filling station 10 and at the heating station 90. The transport mechanism 86 may be configured to supply the fiber cushion body to the post-processing station 110 where laser cutting and/or laser welding are performed.

The installation 120 may comprise additional stations. For illustration, two or more than two thermal treatment stations may be provided.

The filling station 80 may have any one of a variety of configurations. In some implementations, the filling station 80 may use flocks of fiber material as raw material and may separate the flocks into filaments for filling the fibers into the mold. In other implementations, the filling station 80 may use one or several yarns as raw material and may cut the yarn(s) into segments for supplying the fiber material into the mold.

While methods according to various embodiments have been described, modifications may be implemented in other embodiments. For illustration, while techniques have been described in the context of three-dimensional integral fiber cushion bodies, the methods, apparatuses and installations may also be used for processing other resilient fiber bodies, e.g. two-dimensional resilient padding formed from fiber material.

For further illustration, the fiber cushion body does not need to consist exclusively of thermally cross-linked fibers. In exemplary embodiments, adhesive material may be selectively supplied into the mold when the fiber cushion body is formed, so that the adhesive material is concentrated at pre-defined locations within the cavity defined by the mold. The adhesive material may be selectively supplied to locally enhance the density of bonds between fibers.

While methods of producing a fiber cushion body which is subsequently treated using laser radiation have been described in which the fibers are oriented after insertion into the mold, fibers may also be oriented in different ways.

The methods according to embodiments may be used for producing fiber cushion bodies which can be integrated into a wide variety of seats or other furniture. Exemplary seats in which the fiber cushion bodies may be installed include automobile seats, train seats, aircraft seats, seats for home use and seats for office use. Exemplary furniture in which the fiber cushion bodies may be installed include sofas, arm chairs, beds and other furniture. A fiber cushion body may be used at a portion which receives a person's thighs, at a backrest portion supporting a person's back, or at a headrest portion or other component where cushioning is desired.

The invention claimed is:

1. A method of processing a fiber cushion body formed from thermally cross-linked fibers, the method comprising:
    applying laser radiation to the fiber cushion body to form at least a laser cut or a laser weld in the fiber cushion body, wherein the fiber cushion body to which the laser radiation is applied includes a first portion in which fibers have a preferential orientation along a first direction and a second portion having a fiber orientation and/or density different from the first portion.

2. The method of claim 1, wherein applying the laser radiation includes cutting free fiber ends projecting from the fiber cushion body.

3. The method of claim 1, wherein applying the laser radiation includes forming a fixation region in the fiber cushion body by the laser radiation, the fixation region having a density which is greater than a density of the first portion.

4. The method of claim 1, wherein applying the laser radiation includes sealing a surface of the fiber cushion body using the laser radiation.

5. The method of claim 1, wherein the laser radiation is applied at least to the second portion of the fiber cushion body.

6. The method of claim 5, wherein the laser radiation is applied to extend through the second portion into the first portion.

7. The method of claim 1, wherein applying the laser radiation includes forming at least one channel using the laser radiation.

8. The method of claim 7, wherein side walls of the at least one channel are cut by the laser radiation, the method further comprising:
    applying ultrasound to a bottom of the at least one channel.

9. The method of claim 7, further comprising:
    affixing a trim material to the at least one channel.

10. The method of claim 7, wherein applying the laser radiation includes inserting an optical element into a beam path to form a divergent laser beam to provide the at least one channel with a flared shape.

11. The method of claim 1, wherein applying the laser radiation includes performing a welding operation using the laser radiation.

12. The method of claim 11, wherein applying the laser radiation results in a fixation element for a trim material being welded to the fiber cushion body.

13. The method of claim 11, wherein applying the laser radiation results in a trim material being welded to the fiber cushion body.

14. The method of claim 1, further comprising:
    directing a gas flow onto a location at which the laser radiation is applied to the fiber cushion body.

15. The method of claim 14, wherein the gas flow is a flow of pressurized air or of a protective gas.

16. A fiber cushion body comprising:
    a first portion in which fibers have a preferential orientation along a first direction; and
    a second portion having a fiber orientation and/or density different from the first portion,
    wherein the first portion and the second portion are integrally formed,
    wherein a laser cut and/or a laser weld is formed on at least one surface of the fiber cushion body,
    wherein a majority of the fibers of the first portion is oriented at an angle of less than 45° to a direction which is perpendicular to a major face of the fiber cushion body, and
    wherein the fiber cushion body is formed from thermally cross-linked fiber material.

* * * * *